United States Patent [19]

Riviere et al.

[11] 3,879,549

[45] *Apr. 22, 1975

[54] TREATMENT OF BILHARZIOSIS AND FILARIASIS EMPLOYING THE ANTIMONY SALT OF CERTAIN HYDROXY QUINOLINES

[76] Inventors: Eugéne Riviere, 8 rue J. E. Voisembert, 92-Issy Les Moulineaux; Danyéle Yvette Vilarel, 20 rue Marie Amelie, Chantilly-60; Roger Lucien Debrie, 73 rue de la Liberation, 60-Brenouille; Gérald Paul Marie Henri Loiseau, 146 rue Houdan, 92-Sceaux, all of France

[ * ] Notice: The portion of the term of this patent subsequent to Sept. 15, 1987, has been disclaimed.

[22] Filed: July 25, 1973

[21] Appl. No.: 382,411

Related U.S. Application Data

[63] Continuation-in-part of Ser. No. 72,540, Sept. 15, 1970, Pat. No. 3,769,409.

[30] Foreign Application Priority Data

Sept. 19, 1969 France .............................. 69.31912

[52] U.S. Cl. ............................................... 424/245
[51] Int. Cl............................................ A61k 27/00

[58] Field of Search ................. 424/245; 260/289 R

[56] References Cited
UNITED STATES PATENTS

| 2,608,556 | 8/1952 | Kalberg | 424/245 |
| 3,287,210 | 11/1966 | Leebrick | 424/245 |

OTHER PUBLICATIONS

Chemical Abstracts, Vol. 57 (1962), p. 9195(d).

*Primary Examiner*—V. D. Turner
*Attorney, Agent, or Firm*—Browne, Beveridge, DeGrandi & Kline

[57] ABSTRACT

A process for the treatment of bilharziosis or filariasis in human beings which comprises adminstering orally to a human being the antimony salt of 8-hydroxyquinoline, 6-methyl-8-hydroxyquinoline, 5-fluoro-8-hydroxyquinoline, 5-chloro-8-hydroxyquinoline, 5-nitro-8-hydroxyquinoline, 5-sulpho-8-hydroxyquinoline, 5-chloro-7-iodo-8-hydroxyquinoline, 5,7-dibramo-8-hydroxyquinoline, 5-chloro-7-iodo-6-methyl-8-hydroxyquinoline, or 5,7-dibromo-6-methyl-8-hydroxyquinoline, at a daily dose of 60 to 100 mg of the salt per day.

1 Claim, No Drawings

TREATMENT OF BILHARZIOSIS AND FILARIASIS EMPLOYING THE ANTIMONY SALT OF CERTAIN HYDROXY QUINOLINES

This application is a continuation-in-part of application Ser. No. 72,540 filed Sept. 15, 1970, now U.S. Pat. No. 3,769,409.

According to the invention a process is provided for the treatment of bilharziosis or filariasis in human beings which comprises administering orally to a human being the antimony salt of 8-hydroxyquinoline, 6-methyl-8-hydroxyquinoline, 5-fluoro-8-hydroxyquinoline, 5-chloro-8-hydroxyquinoline, 5-nitro-8-hydroxyquinoline, 5-sulpho-8-hydroxyquinoline, 5-chloro-7-iodo-8-hydroxyquinoline, 5,7-dibromo-8-hydroxyquinoline, 5-chloro-7-iodo-6-methyl-8-hydroxyquinoline, or 5,7-dibromo-6-methyl-8-hydroxyquinoline, at a daily dose of 60 to 100 mg of the salt per day.

The salts of the invention which may be used with a pharmaceutically acceptable carrier have a strong amoebicidal power and are practically atoxic at the doses used in human therapy. Their application in this field is thus particularly advantageous.

The salts of the invention may be prepared as in the following preparations in which the parts and percentages inidcated are parts and percentages by weight, unless the contrary is mentioned.

PREPARATION 1:

Antimony salt of 8-hydroxyquinoline

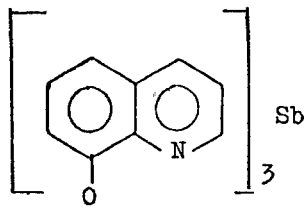

Mol.wt. 553.8

A hydrochloric acid solution of antimony chloride is prepared by dissolving 22.9 parts of antimony trichloride in 40 parts of distilled water containing 10 parts by volume of 36% pure hydrochloric acid.

On the other hand, 54.5 parts of 8-hydroxyquinoline hydrochloride are dissolved in 40 parts of distilled water and the solution is filtered if necessary.

This solution is added to that of antimony chloride, the mixture is heated to 45°-50°C. and neutralised by the addition of a 20% solution of ammonia to a pH 6-7. It is agitated for some minutes at a temperature between 50°C and 60°C filtered at this temperature and the antimony salt is washed with distilled water containing acetic acid (2 parts of acetic acid to 500 parts of distilled water) until the washings no longer contain chlorides. It is dried at 100°c and 52 parts of the salt of the above formula are obtained, the contents of hydroxyquinoline and antimony of which are respectively 78.8% and 21.7%.

PREPARATION 2

Antimony salt of 6-methyl-8-hydroxyquinoline

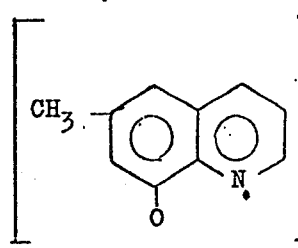

Mol.wt. 595.8

The process is as in Preparation 1, using 58.7 parts of 6-methyl-8-hydroxyquinoline hydrochloride in place of the 8-hydroxyquinoline hydrochloride. A salt having a content of methylhydroxyquinoline of 79.6% and a content of antimony of 20.8% is obtained.

PREPARATION 3

Antimony salt of 5,7-dibromo-8-hydroxyquinoline

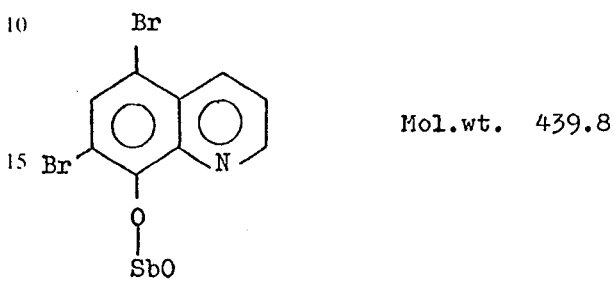

Mol.wt. 439.8

600 parts by volume of a 92.43% solution of ethyl alcohol and 30.3 parts of 5,7-dibromo-8-hydroxyquinoline are introduced into an apparatus provided with a stirrer, a thermometer and a reflux condenser. This mixture is heated under reflux and a solution of 23 parts of antimony trichloride in 50 parts by volume of 36% pure hydrochloric acid is slowly added. The reflux temperature is maintained for some minutes in order to obtain a clear solution. The product is filtered at about 60°C in order to eliminate possible impurities and is neutralised at this temperature by the slow addition of about 7 parts by volume of a 20% solution of ammonia of pH 6-7. The antimony salt is filtered off, washed with a 92.43% solution of ethanol, then with distilled water until the washings no longer contain chlorides, and dried at 100°C. 41.5 parts of a salt with the following contents are obtained: bromine 35.92%, antimony 27.17%, nitrogen 3.17%.

PREPARATION 4

Antimony salt of 5,7-dibromo-6-methyl-8-hydroxyquinoline

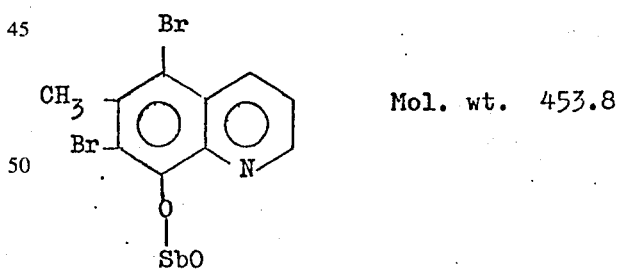

Mol. wt. 453.8

The preparation of this salt is analogous to the process of Preparation 3 but using 1.7 parts of 5,7-dibromo-6-methyl-8-hydroxyquinoline in place of the 5,7-dibromo-8-hydroxyquinoline. Weight of antimonly salt obtained: 43 parts

| Contents of: | nitrogen: | 3.05% |
|---|---|---|
| | bromine: | 34.95% |
| | antimony: | 27.32% |

PREPARATION 5

Antimony salt of 5-chloro-7-iodo-8-hydroxyquinoline

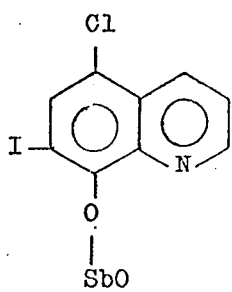

Mol.wt. 442.3

The procedure is as in Preparation 3, but 30.5 parts of 5-chloro-7-iodo-8-hydroxyquinoline are used in place of the 5,7-dibromo-8-hydroxyquinoline. Weight of antimony salt obtained; 40 parts.

| Contents of: | nitrogen: | 3.19% |
|---|---|---|
| | chlorine: | 7.99% |
| | iodine: | 29.39% |
| | antimony: | 28.15% |

PREPARATION 6

Antimony salt of 5-chloro-7-iodo-6-methyl-8-hydroxyquinoline

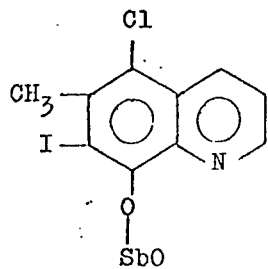

Mol.wt. 456.3

The procedure is as in Preparation 3 but using 32 part of 5-chloro-7-iodo-6-methyl-8-hydroxyquinoline in place of the 5,7-dibromo-8-hydroxyquinoline and 1500 parts by volume of a 92.43% solution of ethyl alcohol.
Weight obtained: 42 parts.
Contents of N = 3.31%, Cl = 7.43%, I = 26.03%, Sb = 28.37%

PREPARATION 7

Antimony salt of 5-chloro-8-hydroxyquinoline

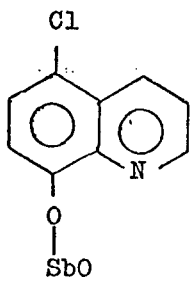

Mol.wt. 316.3

The procedure is as described in Preparation 3, but 18 parts of 5-chloro-8-hydroxyquinoline are used in place of the 5,7-dibromo-8-hydroxyquinoline. Weight obtained: 29 parts
Contents of chlorine: 11.30%, Nitrogen: 4.53% antimony: 38.85%

PREPARATION 8

Antimony salt of 5-nitro-8-hydroxyquinoline

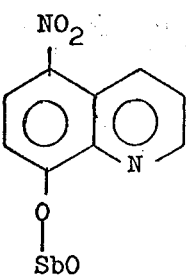

Mol.wt. 326.8

A hydrochloric acid solution of antimony chloride is prepared by dissolving 23 parts of antimony trichloride in 40 parts of distilled water containing 10 parts by volume of 36 % pure hydrochloric acid.

On the other hand 19 parts of 5-nitro-8-hydroxyquinoline are dissolved in 400 parts of distilled water containing 80 parts by volume of 96% pure sulphuric acid.

The clear solution obtained is added to that of the antimony chloride. The mixture is heated to 50°–60°C, neutralised by the addition of 20% solution of ammonia to pH 3–3.5 and maintained for some minutes with agitation at a temperature between 50° and 60°C. The antimony salt formed is filtered off at this temperature, washed in distilled water until the washings no longer contain sulphates and dried at 100°C.
Weight obtained: 32 parts.
Content of nitrogen: 8.65% Content of antimony: 37.12%.

PREPARATION 9

Antimony Salt of 5-sulpho-8-hydroxyquinoline

Mol.wt. 630.8

SbOH

A. 36 parts of neutral sodium tartrate are dissolved in 100 parts of distilled water and there is also prepared a hydrochloric acid solution of antimony chloride by dissolving 23 parts of antimony trichloride in 40 parts of distilled water containing 10 parts by volume of pure 36% hydrochloric acid. This solution is added very slowly to the first solution, the pH of the mixture being kept at between 7 and 7.5 by the addition of 10% soda, say about 100 parts. If the mixture is not clear it is filtered.

B. In addition, 44.5 parts of 5-sulpho-8-hydroxyquinoline are dissolved in 500 parts of distilled water containing 25 parts by volume of a 30% solution of sodium hydroxide. The mixture is heated to 80°–85°C, the pH of the solution being adjusted to 8–8.2. If cloudiness is still present, it is filtered.

The solution of the complex antimony tartrate prepared under (A) is slowly introduced with agitation into the hot solution (B). On cooling the antimony salt of the 5-sulpho-8-hydroxyquinoline crystallises. It is filtered off, washed with a 42.5% solution of ethanol, then with a 92.43% solution of ethanol, and finally is dried at 80°C.
Weight obtained: 45 parts.
Content of nitrogen: 4.52%. sulphur: 9.95%, antimony: 19%.

PREPARATION 10

Antimony salt of 5-fluoro-8-hydroxyquinoline

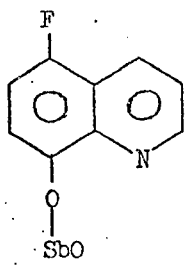

Mol.wt. = 299.7

The solution A of 5-fluoro-8-hydroxyquinoline hydrochloride is prepared by dissolving at 80°C 18 parts of 5-fluoro-8-hydroxyquinoline in 2000 parts of distilled water containing 18 parts by volume of 36% pure hydrochloric acid.

This solution is then poured with agitation into solution A and the mixture, maintained at 50°C, is brought to pH 3.7 to 4 by the addition of 20% ammonia (about 60 parts by volume). The precipitate is filtered, drained and washed with distilled water until the washings no longer contain chlorides. After drying at 100° to 110°C one obtains 27 parts of the antimony salt of 5-fluoro-8-hydroxyquinoline.

| Analysis (%) | C | H | N | F | Sb |
| --- | --- | --- | --- | --- | --- |
| Calculated for $C_9H_5FNO_2Sb$ | 36.05 | 1.68 | 4.67 | 6.33 | 40.60 |
| Found | 37.26 | 2.06 | 4.78 | 6.50 | 40.66 |

Toxicological properties

The antimony salts are administered orally and by a gastric tube to CHARLES RIVER $CD_1$ albino mice.

For all the derivatives described the LD 50 is superior to 900 mg/kg. At the doses used in human therapy, these products may be considered as atoxic.

Bacteriostatic properties

The antimony salt of 8-hydroxyquinoline, chosen by way of example, is suspended in polyethylene glycol 400. The culture medium is prepared from a peptonized medium treated with salt and gelose, having the following composition:

| Meat extract: | 5 g |
| --- | --- |
| Peptone: | 10 g |
| Sodium chloride: | 5 g |
| Gelose: | 20 g |
| Distilled water pH 7.2: | 1000 g (q.s.) |

After liquefaction on a water-bath and cooling to 40°–50°C this medium is run into Petri dishes containing the aforesaid suspension of the antimony salt and is strongly agitated so as to distribute some insoluble grains of the latter as regularly as possible in the gelose-containing medium. The bacterial strains are transferred in peptonized salted broth (without gelose) the day before the test. After 24 hours in an oven at 37°C. the medium run into a Petri dish is inoculated in streaks on the surface and the dishes are put in the oven at 37°C. A control dish receives the polyethylene glycol 400. The results are as follows:

| Staphylococcus | E. coli | Enterococcus | Pneumobacillus | Pyocanic |
| --- | --- | --- | --- | --- |
| 10 | 20 | 10 | 10 | >40 |

These results show that the antimony salt of 8-hydroxyquinoline possesses a high bacteriostatic power.

The control tubes, without an inhibiting product, but containing all the concentrations of polyethylene glycol 400 used, have always shown a culture positive for the germs used. Amoebicidal properties The tests consisted in defining "in vitro" the amoebicidal activity of a strain of Entamoeba dysenteriae kept on a PAVLOVA-JONES medium the reference substance taken being emetine hydrochloride and two different processes being used.

1. Inhibition at the start of the cultures

The minimal concentration which prevents the striking of the culture after 72 hours at 37°C, is determined. The inoculation consists of about 10,000 amoebae per tube of culture, and the product to be tested in suspended in Tween 80 (a polyoxyethylenated sorbitol mono-oleate).

2. Lethal action of a culture of 3 days

The minimal concentration which kills all the amoebae of a culture of 3 days after 48 hours at 37°C is determined. The inoculation consists of about 10,000 amoebae per tube, and the product to be tested is suspended in Tween 80.

The results obtained are collected in Tables I, II and III below. A represents the antimony salt of 8-hydroxyquinoline, B the antimony salt of 6-methyl-8-hydroxyquinoline and C the antimony salt of 5-fluoro-8-hydroxyquinoline. In Table III, the products A, B and C have been compared with the reference product emetine hydrochloride (C.E.).

In Tables I, II and III, and number 0 and the signs +, ++, and +++ have the following significances:

| | |
| --- | --- |
| 0 : | totally inhibited culture |
| + : | little plentiful culture |
| ++ : | plentiful culture |
| +++ : | very plentiful culture |

I. Amoebicidal activity in vitro inhibition at the start of the cultures

| | Concentrations | | |
| --- | --- | --- | --- |
| | 1/10,000 | 1/100,000 (= 10 mg/l) | 1/1,000,000 |
| Product A | 0 | 0 | +++ |
| Product B | 0 | 0 | +++ |
| Product C | 0 | 0 | ++ |

II. Amoebicidal activity in vitro: inhibition at the start of the cultures

|  | 1/100,000 | 1/200,000 | Concentrations 1/400,000 | 1/800,000 | 1/1,600,000 |
|---|---|---|---|---|---|
| Product A | 0 | 0 | 0 | 0 | ++ |
| Product B | 0 | 0 | 0 | ++ | +++ |
| Product C | 0 | 0 | 0 | 0 | + |

III. Amoebicidal activity in vitro: lethal action on a culture of 3 days

|  | 1/100,000 | 1/200,000 | Concentrations 1/400,000 | 1/800,000 | 1/1,600,000 |
|---|---|---|---|---|---|
| Product A | 0 | 0 | ++ | +++ | +++ |
| Product B | 0 | + | ++ | +++ | +++ |
| Product C | 0 | + | ++ | +++ | +++ |
| C.E. | 0 | + | ++ | +++ | +++ |

Anti-bilharzian properties

The anti-bilharzian activity was studied with products A and B in CD 1 mice which had been previously infested with Schistosoma Monsoni (Porto-Rico origin) according to the technique described by Pellegrino J. and Katz N. (1969, Ann N.Y. Acad. Sc., 160, 429–460). The animals were infested with Schistosoma Mansoni carcaria and treated daily with the product to be studied for 5 days starting from the 45th day after infestation. Three days after the end of the treatment, the oogramme was determined and the test for total perfusion of the portal system was carried out. The results are set out in the following Table:

| Product | Dose during 5 days (mg/kg by mouth) | Mouse Oogramme Dead eggs in % | Perfusion of the portal system (effect in %) |
|---|---|---|---|
| A | 100 | 10 | 20 |
|   | 200 | 40 | 30 |
| B | 100 | 50 | 40 |
|   | 200 | 70 | 65 |

These results show that products A and B exhibit, in mice by mouth, an anti-bilharzian activity.

Antihelminthic properties the antihelminthic activity of the compounds of the invention was studied, on the one hand, with regard to cestodes in mice infested with hymenolepis nana var. fraterna according to Cavier R. and Notteghem M. (J. Ann. Pharm. franc. 26, 603–606, 1968) and, on the other hand, with regard to nematodes in mice which had been previously infested with syphacia obvelata according to Cavier (Bull. Soc. Path. exot., 55, 412–417, 1962).

In the following Tables, D designates the antimony salt of 5-chloro-7-iodo-8-hydroxy-quinoline, E designating the antimony salt of 5-chloro-7-iodo-6-methyl-8-hydroxy-quinoline, F designating the antimony salt of 5-nitro-8-hydroxy-quinoline and G designating the antimony salt of 5-sulpho-8-hydroxy-quinoline.

| Product | Dose in mg/kg by mouth | Antihelminthic activity by mouth in mice infested with hymenolepis nana. Deparasited mice (in %) | Mortality |
|---|---|---|---|
| A | 25 | 50 | 0/10 |
|   | 50 | 90 | 0/10 |
|   | 100 | 100 | 0/10 |
|   | 200 | 100 | 1/12 |

-Continued

| Product | Dose in mg/kg by mouth | Antihelminthic activity by mouth in mice infested with hymenolepis nana. Deparasited mice (in %) | Mortality |
|---|---|---|---|
| B | 25 | 10 | 0/10 |
|   | 50 | 90 | 0/10 |
|   | 100 | 90 | 0/10 |
|   | 200 | 92 | 0/13 |
| E | 25 | 0 | 0/10 |
|   | 50 | 30 | 0/10 |
|   | 100 | 90 | 0/10 |
|   | 200 | 86 | 0/22 |
| F | 25 | 10 | 0/10 |
|   | 50 | 50 | 0/10 |
|   | 100 | 90 | 0/10 |
|   | 200 | 81 | 0/22 |
| G | 25 | 10 | 0/10 |
|   | 50 | 100 | 0/10 |
|   | 100 | 100 | 0/10 |
|   | 200 | 100 | 1/12 |

| Product | Dose in mg/kg by mouth | Antihelminthic activity by mouth in mice infested with syphacia obvelata Deparasited mice (in %) | Mortality |
|---|---|---|---|
| D | 200 | 63 | 4/15 |
| E | 200 | 50 | 3/15 |
| F | 200 | 41 | 3/15 |

These results show that the antimony salts of the invention have a strong antihelminthic activity and are particularly suitable for the treatment of filariases.

Therapeutic applications

The data for these different antimony salts of 8-hydroxyquinoline derivatives relate to the treatment of bilharziosis, amoebiasis, leishmaniasis, filariasis, and microbial diarrhoea. These products may be administered in the form of compressed tablets of 10 mg. each at the rate of 6 to 10 a day.

We claim:

1. A process for the treatment of bilharziosis or filariasis in human beings which comprises adminstering orally to a human being in need of such treatment an effective amount of the antimony salt of 8-hydroxyquinoline, 6-methyl-8-hydroxyquinoline, 5-fluoro-8-hydroxyquinoline, 5-chloro-8-hydroxyquinoline, 5-nitro-8-hydroxyquinoline, 5-sulpho-8-hydroxyquinoline, 5-chloro-7-iodo-8-hydroxyquinoline, 5,7-dibromo-8-hydroxyquinoline, 5-chloro-7-iodo-6-methyl-8-hydroxyquinoline, or 5,7-dibromo-6-methyl-8-hydroxyquinoline, at a daily dose of 60 to 100 mg of the salt per day.

* * * * *

UNITED STATES PATENT OFFICE
CERTIFICATE OF CORRECTION

PATENT NO. : 3,879,549
DATED : April 22, 1975
INVENTOR(S) : EUGENE RIVIERE ET AL It is certified that error appears in the above-identified patent and that said Letters Patent are hereby corrected as shown below:

In the heading, please correct the third inventor's name as follows:

-- GERARD PAUL MARIE HENRI LOISEAU --

Signed and Sealed this eleventh Day of November 1975

[SEAL]

Attest:

RUTH C. MASON
Attesting Officer

C. MARSHALL DANN
Commissioner of Patents and Trademarks